United States Patent
Malinovskiy et al.

(10) Patent No.: US 9,374,661 B2
(45) Date of Patent: Jun. 21, 2016

(54) TRAVEL PATTERN DISCOVERY USING MOBILE DEVICE SENSORS

(71) Applicant: University of Washington through its Center for Commercialization, Seattle, WA (US)

(72) Inventors: Yegor Malinovskiy, Portland, OR (US); Yinhai Wang, Seattle, WA (US)

(73) Assignee: University of Washington through its Center for Commercialization, Seattle, WA (US)

( * ) Notice: Subject to any disclaimer, the term of this patent is extended or adjusted under 35 U.S.C. 154(b) by 41 days.

(21) Appl. No.: 13/855,605

(22) Filed: Apr. 2, 2013

(65) Prior Publication Data

US 2013/0260791 A1 Oct. 3, 2013

Related U.S. Application Data

(60) Provisional application No. 61/619,184, filed on Apr. 2, 2012, provisional application No. 61/780,095, filed on Mar. 13, 2013.

(51) Int. Cl.
*H04W 4/02* (2009.01)
*H04W 64/00* (2009.01)

(52) U.S. Cl.
CPC .............. *H04W 4/02* (2013.01); *H04W 4/025* (2013.01); *H04W 64/00* (2013.01)

(58) Field of Classification Search
CPC ....... H04W 4/02; H04W 64/00; H04W 4/028; G01C 21/34; G01C 21/3492; G01S 5/0294; G01S 5/0278
See application file for complete search history.

(56) References Cited

U.S. PATENT DOCUMENTS

| 7,076,365 | B2 | 7/2006 | Tzamaloukas |
| 7,486,199 | B2 | 2/2009 | Tengler et al. |
| 2004/0073361 | A1 | 4/2004 | Tzamaloukas et al. |
| 2008/0076483 | A1* | 3/2008 | Shim .......................... 455/569.2 |
| 2009/0210141 | A1 | 8/2009 | Young et al. |

(Continued)

OTHER PUBLICATIONS

Abdelzaher, T., Y. Anokwa, P. Boda, J. Burke, D. Estrin, L. Guibas, A. Kansai, S. Madden, and J. Reich, "Mobiscopes for Human Spaces," IEEE Pervasive Computing, vol. 6, Apr. 2007, pp. 20-29.

(Continued)

*Primary Examiner* — Olumide T Ajibade Akonai
*Assistant Examiner* — Margaret G Mastrodonato
(74) *Attorney, Agent, or Firm* — Perkins Coie LLP

(57) ABSTRACT

A facility comprising methods and systems for discovering travel patterns based at least in part on data collected from a plurality of dynamic and/or mobile sensor devices is disclosed. The mobile sensor devices sense or detect the presence of nearby devices and record information about each detection, such as the location, the date and time, and an identifier of the detected device and provide this information to the facility. Thus, the facility can leverage the communication capabilities of existing mobile devices and networks to provide a broad, wide-ranging, scalable sensor network that detects the presence of individual devices. By recording and analyzing the encounter data received from various mobile sensor devices, the facility can ascertain or estimate the path of devices and their associated users. Given the availability of mobile devices and mobile networks, the disclosed techniques can be deployed without a substantial investment in infrastructure and maintenance.

21 Claims, 5 Drawing Sheets

(56) References Cited

U.S. PATENT DOCUMENTS

| | | | |
|---|---|---|---|
| 2009/0258660 A1 | 10/2009 | Bush et al. | |
| 2010/0271263 A1 | 10/2010 | Moshfeghi | |
| 2010/0302070 A1 | 12/2010 | Puckett et al. | |
| 2011/0137551 A1* | 6/2011 | Peri | 701/201 |
| 2012/0163206 A1* | 6/2012 | Leung et al. | 370/252 |
| 2013/0179067 A1* | 7/2013 | Trowbridge et al. | 701/410 |
| 2013/0311088 A1* | 11/2013 | Friedlander et al. | 701/517 |

OTHER PUBLICATIONS

Ahmed, H., M. El-Darieby, B. Abdulhai, and Y. Morgan. Bluetooth- and Wi-Fi-Based Mesh Network Platform for Traffic Monitoring. In Transportation Research Board 87th Annual Meeting. CD-ROM. Transportation Research Board, 2008.

Alta Planning and Design. "National Bicycle and Pedestrian Document Project." Alta Planning and Design, Inc. 2006. www.altaplanning.com/. Accessed Jan. 31, 2011.

Borgers, A. and H. Timmermans, "A Model of Pedestrian Route Choice and, Demand for Retail Facilities within Inner-City Shopping Areas", Geographical analysis 18 (1986) No. 2.

Bullock, D., R. Haseman, J. Wasson and R. Spitler. "Anonymous Bluetooth Probes for Measuring Airport Security Screening Passage Time: The Indianapolis Pilot Deployment" In Transportation Research Board 89th Annual Meeting. CD-ROM. Transportation Research Board, Washington D.C., 2010.

Cortright, J. "Walking the Walk: How Walkability Raises Home Values in U.S. Cities," Aug. 2009.

Cuff, B.D. and M. Hansen, "Urban Sensing: Out of the Woods," Communications of the ACM, vol. 51, 2008.

Grable, F. and Kretz, T. "An Example of Complex Pedestrian Route Choice." In PED2010 Proceedings Book, 2010.

Haghani, A., M. Hamedi, K.F. Sadabadi, S. Yound and P. J. Tarnoff. "Freeway Travel Time Ground Truth Data Collection Using Bluetooth Sensors" In Transportation Research Board 89th Annual Meeting. CD-ROM. Transportation Research Board, Washington D.C., 2010.

Haseman, RJ., J. Wasson and D. Bullock. "Work Zone Travel Time Delay and Evaluation Metrics Using Bluetooth Probe Tracking" In Transportation Research Board 89th Annual Meeting. CD-ROM. Transportation Research Board, Washington D.C., 2010.

Ismail, K., T. Sayed and N. Saunier, "Automated Analysis of Pedestrian-Vehicle Conflicts Using Video Data." Transportation Research Record: Journal of the Transportation Research Board, Washington, DC., 2009, vol. 2140, pp. 44-54.

Kanjo, E., "NoiseSPY: A Real-Time Mobile Phone Platform for Urban Noise Monitoring and Mapping," Mobile Networks and Applications, vol. 15, Nov. 2009, pp. 562-574.

Kiukkonen, N., J. Blom, O. Dousse, D. Gatica-Perez, and J. Laurila, "Towards Rich Mobile Phone Datasets: Lausanne Data Collection Campaign", in Proc. ACM Int. Conf. on Pervasive Services (ICPS), Berlin, Jul. 2010.

Kong, D. D. Gray, and H. Tao (2006). A Viewpoint Invariant Approach for Crowd Counting. Proceedings of the 18th International Conference on Pattern Recognition, vol. 3, 1187-1190.

Krumm, J., "Ubiquitous Advertising: The Killer Applications for the 21st Century", IEEE Pervasive 2010.

Lane, N.D., E. Miluzzo, H. Lu, D. Peebles, and T. Choudhury, "Ad hoc and Sensor Networks A Survey of Mobile Phone Sensing," IEEE Communications Magazine, 2010, pp. 140-150.

Li, Y., and Tsukaguchi, H. (2005). "Relationships between network topology and pedestrian route choice behaviour." Journal of the Eastern Asia Society for Transportation Studies, 6, 241-248.

Litman, Todd. "Measuring Transportation: Traffic, Mobility and Accessibility." Victoria Transport Policy Institute. Nov. 2008. Accessed Jan. 31, 2010. http://www. vtpi.org/measure.pdf.

Malinovskiy, Y., Lee U., Wu Y. and Y. Wang Y. "Investigation of Bluetooth-Based Travel Time Estimation Error on a Short Corridor," In Transportation Research Board 90th Annual Meeting. Transportation Research Board, Washington D.C., 2011.

Malinovskiy, Y., Y. Wu and Y. Wang. "Video-Based Monitoring of Pedestrian Movements at Signalized Intersections", Transportation Research Record. 2008.

Manual on Uniform Traffic Control Devices for Streets and Highways. FHWA, U.S. Department of Transportation, 2009. mutcd.fhwa.dot.gov/.

Naini, F.M., "Population Sampling Using Mobile Phones," Research Proposal, Ecole Polytechnique Federale de Lausanee. Jun. 29, 2010.

O'Neill, E., T. Kindberg, A.F. genSchieck, T. Jones, A. Penn, and D.S. Fraser. "Instrumenting the city: developing methods for observing and understanding the digital cityscape". In Proc. of the 8th International Conference on Ubiquitous Computing (UBICOMP), 2006.

Paulos, E. and E. Goodman, "The Familiar Stranger: Anxiety, Comfort, and Play in Public Places," Culture, vol. 6, 2004, pp. 223-230.

Quayle, S., P. Koonce, D. DePencier, and D. Bullock. "Freeway Arterial Performance Measures Using MAC Readers: Portland Pilot Study" In Transportation Research Board 89th Annual Meeting. CD-ROM. Transportation Research Board, Washington D.C., 2010.

Schneider, R., R. Patton, J. Toole and C. Rabom. "Pedestrian and Bicycle Data Collection in United States Communities: Quantifying Use, Surveying Users, and Documenting Facility Extent". Report commissioned for the Federal Highway Administration Office of Natural and Human Environment. Jan. 2005.

Tarnoff, P.B., Darcy; Young, Stanley; Wasson, James; Ganig, Nicholas; Sturdevant, James. "Continuing Evolution of Travel Time Data Information Collection and Processing," In Transportation Research Board 88th Annual Meeting. CD-ROM. Transportation Research Board, Washington D.C., 2009.

Wasson, J.S., J.R. Sturdevant, and D.M. Bullock. Real-Time Travel Time Estimates Using Media Access Control Address Matching. ITE Journal, vol. 78, No. 6, 2008, pp. 20-23.

Weiser, M., "The computer for the 21st century," Scientific American, vol. 265, 1991, p. 94-104.

Whitbeck, J., M.D.D. Amorim, and V. Conan, "Plausible Mobility: Inferring Movement from Contacts," Measurement, 2010.

* cited by examiner

TRAVEL PATTERN DISCOVERY USING MOBILE DEVICE SENSORS

CROSS-REFERENCE TO RELATED APPLICATIONS

This application claims the benefit of U.S. Provisional Patent Application No. 61/619,184, titled TRAVEL PATTERN DISCOVERY USING MOBILE DEVICE SENSORS, filed on Apr. 2, 2012 and U.S. Provisional Patent Application No. 61/780,095, titled TRAVEL PATTERN DISCOVERY USING MOBILE DEVICE SENSORS, and filed on Mar. 13, 2013, each of which is herein incorporated by reference in its entirety.

BACKGROUND

Determining and understanding how individuals navigate between places on foot is important to many aspects of society. City planners, civil engineers, marketing companies, business owners, forest rangers, and so on are all interested in understanding travel patterns so that they can understand the needs of those they serve and improve the services they provide. For example, a city planner may determine that various pathways or walkways need to be improved based on detected or known travel patterns. As another example, a forest ranger may determine that a particular trail should be closed or highlighted if the trail is used infrequently. As another example, a marketing company made decide where to place (or not place) advertisements or other marketing materials based on travel patterns.

Present data collection approaches for foot travel include surveys, manual counts, stationary sensors (infra-red trip line sensors or inductance loops), and video-based data collection system. With the exception of widely-distributed surveys, these approaches provide data for a very limited region (e.g., a single data collection point) or require infrastructure that can be expensive to install and maintain. Similarly, widely-distributed surveys can be expensive to disseminate and process and may suffer from self-selection bias as some individuals simply will not take the time to complete surveys. Furthermore, some communities choose to conduct surveys or travel pattern studies infrequently (due to costs), such as once per year. This approach does not provide adequate travel pattern data as it does not account for changes in travel patterns throughout the year or even over the course of a day. Current techniques for determining and understanding pedestrian travel patterns are typically expensive to install and maintain, do not scale well, and do not provide sufficient data to monitor a wide area over a wide timeframe.

DETAILED DESCRIPTION

Figure 1:
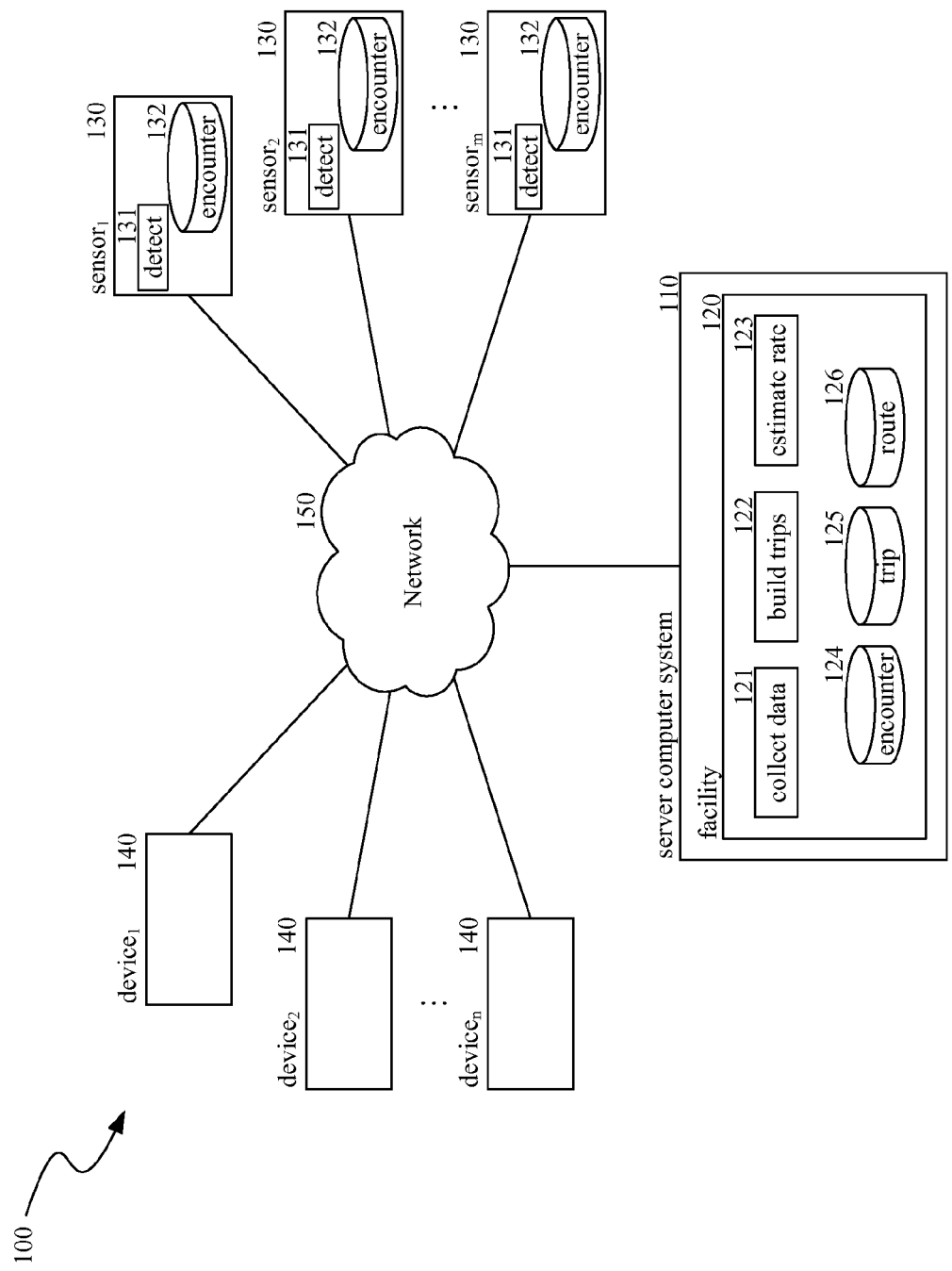
FIG. 1 is a block diagram illustrating an environment in which a facility in accordance with an embodiment of the disclosed technology may operate.

A facility comprising methods and systems for discovering travel patterns based at least in part on data collected from a plurality of dynamic and/or mobile sensor devices is disclosed. In some embodiments, the mobile sensor devices sense or detect the presence of nearby devices and record information about each detection, such as the location (e.g., Global Positioning System (GPS) coordinates), the date and time (e.g., a UTC timestamp), an identifier or other indication of the detected device (e.g., a media access control address (MAC)), a device type for the detected device (e.g., mobile phone, watch, personal digital assistant, media player, notebook computer, tablet, headset, in-vehicle system, valve cap, thermometer), and so on. For example, many mobile devices broadcast unique MAC addresses periodically while in, for example, a "discoverable" mode. Furthermore, these broadcasts can occur promiscuously such that all potential listeners (e.g., mobile sensor devices) may acquire the MAC address of the broadcasting device(s) freely. A mobile device, such as a mobile telephone, tablet, or vehicle navigation system, may be configured as a mobile sensor device by, for example, downloading and installing an application that periodically scans for wireless communications from other devices and/or enabling a promiscuous mode of the mobile device. The mobile sensor devices can detect the broadcasts of other devices and record information about the time and location of each detection. For example, as a mobile sensor device, such as a mobile telephone, is carried on a city street, a college campus, a crowded subway platform, etc., the mobile sensor device may encounter and detect any number of devices. The information associated with each detection, or "encounter," can be recorded and/or transmitted for retrieval and analysis. A single device may be detected at various locations by different mobile sensor devices as the detected device and the mobile sensor devices move throughout their environment. In this manner, the facility can leverage the communication capabilities of existing mobile devices and networks to provide a broad, wide-ranging, scalable sensor network that detects the presence and path of individual devices. By recording and analyzing the encounters, the facility can ascertain or estimate the path of devices and their associated users. Moreover, given the availability of mobile devices and mobile networks, the disclosed techniques can be deployed without a substantial investment in infrastructure and maintenance.

In some embodiments, the facility periodically receives encounter data from mobile sensor devices. The encounter data includes, for each encounter, an indication of when and where the encounter occurred, an indication of the encountered device, and an indication of a device type. Because the detected devices and the mobile sensor devices are likely to move over time, multiple mobile sensor devices may encounter and detect a single device. In other words, a single device may be encountered and detected by different mobile sensor devices at different times and at different locations. Similarly, a single device may be encountered and detected by the same mobile sensor device at different times and at different locations. Based at least in part on the received encounter data, the facility can identify unique devices among the detected devices and can construct a rough estimate of the path of the device over time, even if the successive encounters are with different mobile sensor devices. For each successive encounter, the facility can establish a trajectory for the device based at least in part on the temporal and spatial displacement between each encounter. The facility can use the trajectories as a basis for approximating the path of the device and these paths can be used to assess travel patterns for devices and their associated users.

In some embodiments, the facility constructs a set of trips for a device based at least in part on a set of related trajectories. For example, a device may be detected several times in one neighborhood on one day and again several days later in another neighborhood and construct a series of trajectories based at least in part on these encounters. The facility may distinguish between the two trips based at least in part on the gap in time between the last encounter of the first day and the first encounter of the second day. In some embodiments, the facility may be use finer levels of granularity to distinguish between trips. For example, if a device is detected several times traveling in a particular area and then is not detected or is detected in approximately the same area (e.g., within 5 feet, 10 feet, 50 feet) for at least a threshold period of time (e.g., 15 minutes, one hour, 12 hours), the facility may consider detections prior to the "break" one trip and detections after the "break" another trip, such as trips to and from work, trips to and from lunch, trips to and from a shopping excursion, and so on. As another example, the facility may use mode of transportation (e.g., walking, bicycle, vehicle, train) to distinguish between trips. The facility may distinguish between modes of transportation based at least in part on, for example, the speed (distance divided by time) of each trajectory, the device type (e.g., in-vehicle system vs. pedometer), and so on.

In some embodiments, the facility estimates travel paths or routes for one or more trips. Because the mobile sensor devices are not fixed, a device may be detected by multiple mobile sensor devices at any number of points along its route and a device may travel along any of a number of different paths or routes between successive encounters. For example, when traveling from one side (point A) of a building, fountain, lake, or other obstacle, to another side (point B), a device may travel around the obstacle, through the obstacle, across the obstacle, and so on, such as through a building or across a bridge. However, if the device is not encountered by a mobile sensing device as it traverses from point A to point B, the facility may not know with certainty which path or route the device took between point A and point B. However, the facility can use information about various routes and route segments (e.g., travel time, cost, difficultly, distance, ratings, popularity) an estimate the likely path taken between point A and point B. As the number of encounters for a device increases for a particular trip, as the does the likelihood that the estimated route will correspond to the route actually taken by the device. For example, if a mobile sensor device and a detected device are traveling along the same route at approximately the same speed and direction, the "resolution" for the detected device's trip will be greater than for a detected device that is traveling in the opposite direction and that has very few encounters with mobile sensor devices.

FIG. 1 is a block diagram illustrating an environment 100 in which a facility in accordance with an embodiment of the disclosed technology may operate. In this example, environment 100 includes server computer system 110, mobile sensor devices 130, devices 140, and network 150. Server computer system 110 comprises facility 120 comprised of a collect data component 121, a build trips component 122, an estimate route component 123, an encounter store 124, a trip store 125, and a route store 126. The facility invokes the collect data component 121 to collect and store encounter data from each of the plurality of mobile sensor devices 130. The facility invokes the build trips component 122 to process the collected encounter data and determine trips for each of the detected devices. The facility invokes the estimate routes component 123 to identify potential paths or routes for a trip and determine the most likely path or route from among those identified. The encounter store 124 stores encounter data, such as an indication of encountered or detected devices, a day/time when the device was detected, a location where the device was detected, and the type of device detected. The trip store 125 stores trip information, such as a set of trajectories and/or encounters associated with each trip. The route store 126 stores information for a plurality of routes and/or route segments, such as one or more popularity ratings for each route or route segment, one or more costs for each route or route segments, one or more coordinates associated with each route or route segment, and so on. Mobile sensor devices 130 comprise mobile devices (e.g., mobile telephones, tablets, laptops, BLUETOOTH-enabled devices, motor vehicles) configured to sense and detect encounters with devices 140. Mobile sensor devices may include various hardware and software components configured to detect devices and receive and transmit encounter data 132 to the facility. In some embodiments, mobile sensor devices 130 can be detected by other mobile sensor devices. In some embodiments, communication between devices and systems may occur via the network 150 or directly via wired or wireless communication connection (e.g., radio frequency, WiFi, BLUETOOTH).

The computing devices on which the disclosed systems are implemented may include a central processing unit, memory, input devices (e.g., keyboard and pointing devices), output devices (e.g., display devices), and storage devices (e.g., disk drives). The functions or algorithms of the facility and other systems/devices described herein are implemented in hardware, and/or software in embodiments. The software comprises computer executable instructions on computer readable media. Non-transitory computer-readable media include tangible media such as hard drives, CD-ROMs, DVD-ROMs, and memories such as ROM, RAM, and Compact Flash memories that can store instructions. Signals on a carrier wave such as an optical or electrical carrier wave are examples of transitory computer-readable media. Further, such functions correspond to modules, which are software, hardware, firmware, or any suitable combination thereof. Multiple functions are performed in one or more modules as desired, and the embodiments described are merely examples. A digital signal processor, ASIC, microprocessor, or any other suitable type of processor operating on a system, such as a personal computer, server computer, supercomputing system, a router, or any other device capable of processing data including network interconnection devices executes the software. Instructions, data structures, and message structures may be transmitted via a data transmission medium, such as a signal on a communications link and may be encrypted. Various communications links may be used, such as the Internet, a local area network, a wide area network, a personal area network, a point-to-point dial-up connection, a cell phone network, and so on.

The disclosed technology may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Many embodiments of the technology described herein may take the form of computer-executable instructions, including routines executed by a programmable computer. Those skilled in the relevant art will appreciate that aspects of the technology can be practiced on computer systems other than those shown and described herein. Embodiments of the technology may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on. Moreover, the technology can be embodied in a special-purpose computer or data processor that is specifically programmed, configured or constructed to perform one or more of the computer-executable instructions described herein. Accordingly, the terms "computer" or "system" as generally used herein refer to any suitable data processor and can include Internet appliances and handheld devices (including palmtop computers, wearable computers, cellular or mobile phones, multi-processor systems, processor-based or programmable consumer electronics, network computers, mini computers and the like). Information handled by these computers can be presented at any suitable display medium, including a CRT display or LCD.

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the technology.

Figure 2:
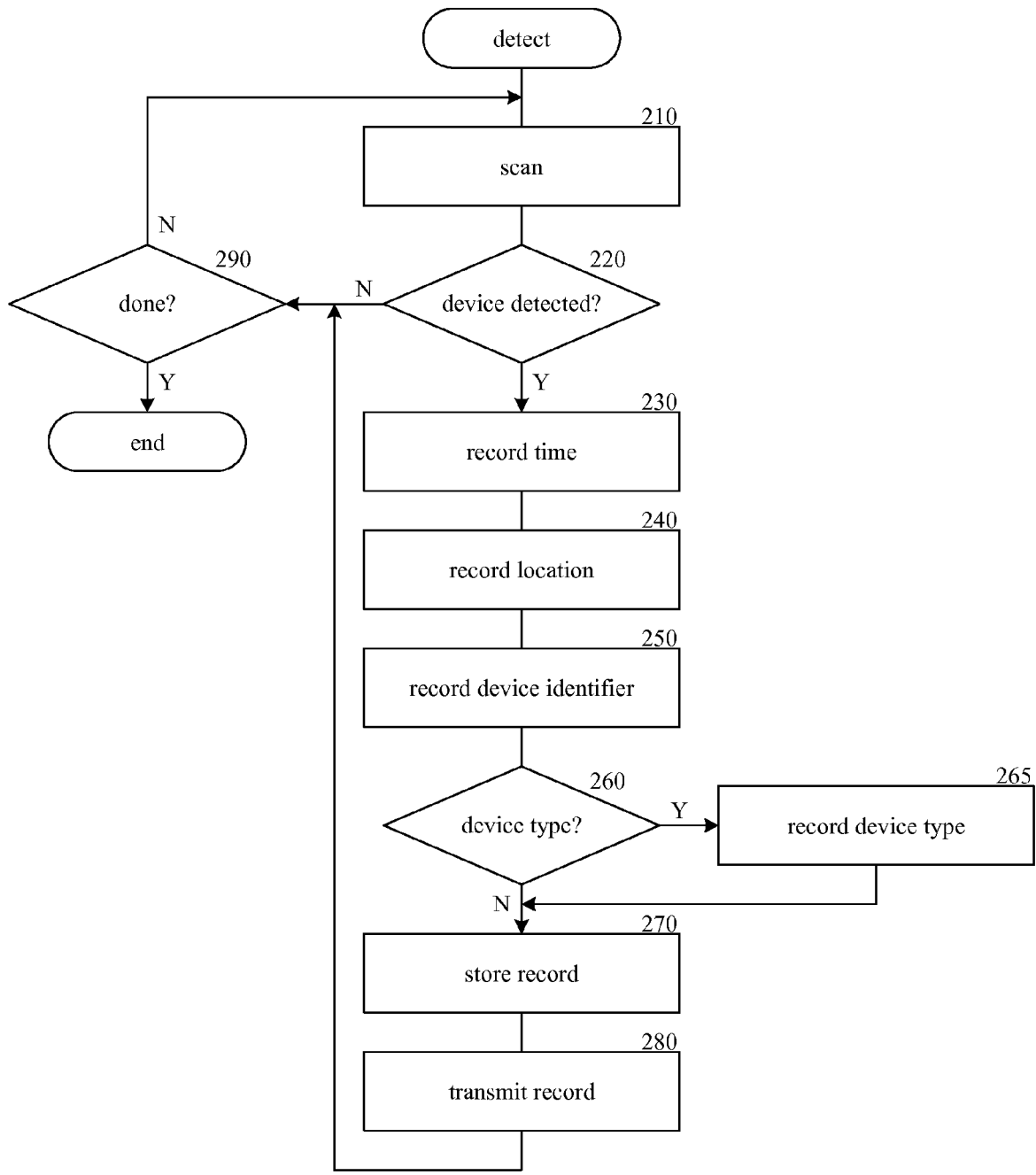
FIG. 2 is a flow diagram illustrating the processing of a detect component in accordance with an embodiment of the disclosed technology.

FIG. 2 is a flow diagram illustrating the processing of a detect component 131 in accordance with an embodiment of the disclosed technology. The detect component is invoked by a mobile sensor device to detect and record information about nearby or encountered devices. In block 210, the component scans for nearby devices. For example, the component may loop through various receivers or sensors listening for compatible devices broadcasting identification information (e.g., devices communicating via BLUETOOTH, Near Field Communication (NFC), CDMA, GSM, or other radio transmission technologies). In decision block 220, if a device is detected, then the component continues at block 230, else the component continues at decision block 290. In block 230, the component records the current time, such as a date and timestamp. In block 240, the component records the location of the mobile sensor device, such as a set of GPS coordinates or other location information (e.g., street address). In block 250, the component records a device identifier for the detected device, such as a MAC address, or other identifying information. In decision block 260, if the detected device is broadcasting device type information, then the component continues at block 265, else the component continues at block 270. In block 265, the component records the device type information. In block 270, the component stores the recorded information as a record in an encounter store. In block 280, the component transmits the record to the facility and then loops back to decision block 290. In decision block 290, if the component has finished detected devices, then the component completes, else the component loops back to block 210 to continue scanning for devices.

Figure 3:
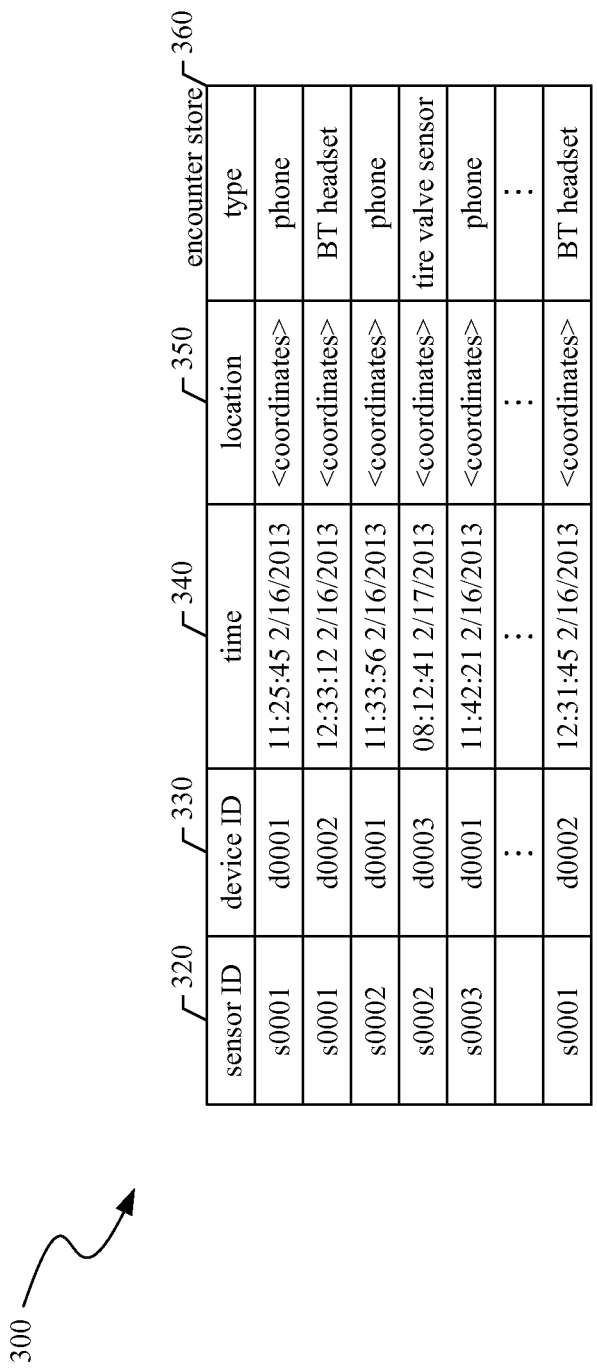
FIG. 3 is a data structure diagram illustrating an encounter store in accordance with an embodiment of the disclosed technology.

FIG. 3 is a data structure diagram illustrating an encounter store in accordance with an embodiment of the disclosed technology. Encounter store 300 stores information about a plurality of encounters and is comprised of a plurality of rows, each row corresponding to a single encounter and specifying a sensor identifier in column 320, a device identifier in column 330, a time in column 340, a location in column 350, and a device type in column 360. Sensor id column 320 stores, for each row or encounter, an identifier for the mobile sensor device that detected and recorded the encounter. The sensor identifier may be an identifier assigned to the mobile sensor device by a manufacturer or provider of the mobile sensor device, a manufacturer or provider of a component of the mobile sensor device, or another system, such as a MAC address, an IP address, phone number, international mobile subscriber identity of a subscriber identity module (SIM card), or other suitable identification information available to the mobile sensor device. In some embodiments, the sensor id may be an identifier assigned to the mobile sensor device by the facility, such as a username, an encrypted instance of an identifier associated with the mobile sensor device, or other suitable identification information. Device id column 330 stores, for each row or encounter, an identifier for the detected device, such as an identifier assigned to the device by a manufacturer or provider of the device, a manufacturer or provider of a component of the device, or another system, such as a MAC address, an IP address, or other suitable identification information broadcast by the device. In some embodiments, the device id may be an identifier assigned to the device by the facility, such as a username, an encrypted instance of an identifier associated with the device, or other suitable identification information. Time column 340 store information about when the encounter occurred, such as a date and time stamp. Location column 350 stores information about where the encounter occurred, such as a set of GPS coordinates. Type column 360 stores an indication of the type of device detected (i.e., the device identified in column 330), such as "mobile phone," "iPhone," "BLUETOOTH headset," "BLUETOOTH tire valve cap," and so on. One skilled in the art will recognize that encounter data stored in tables may consist of any number of rows and columns, each column corresponding to a specific attribute and each row corresponding to attributes associated with a specific encounter stored in the table. One skilled in the art will recognize that while FIG. 3 provides an illustration that is easily comprehensible by a human reader, the information may be stored using different data structures and data organizations.

Figure 4:
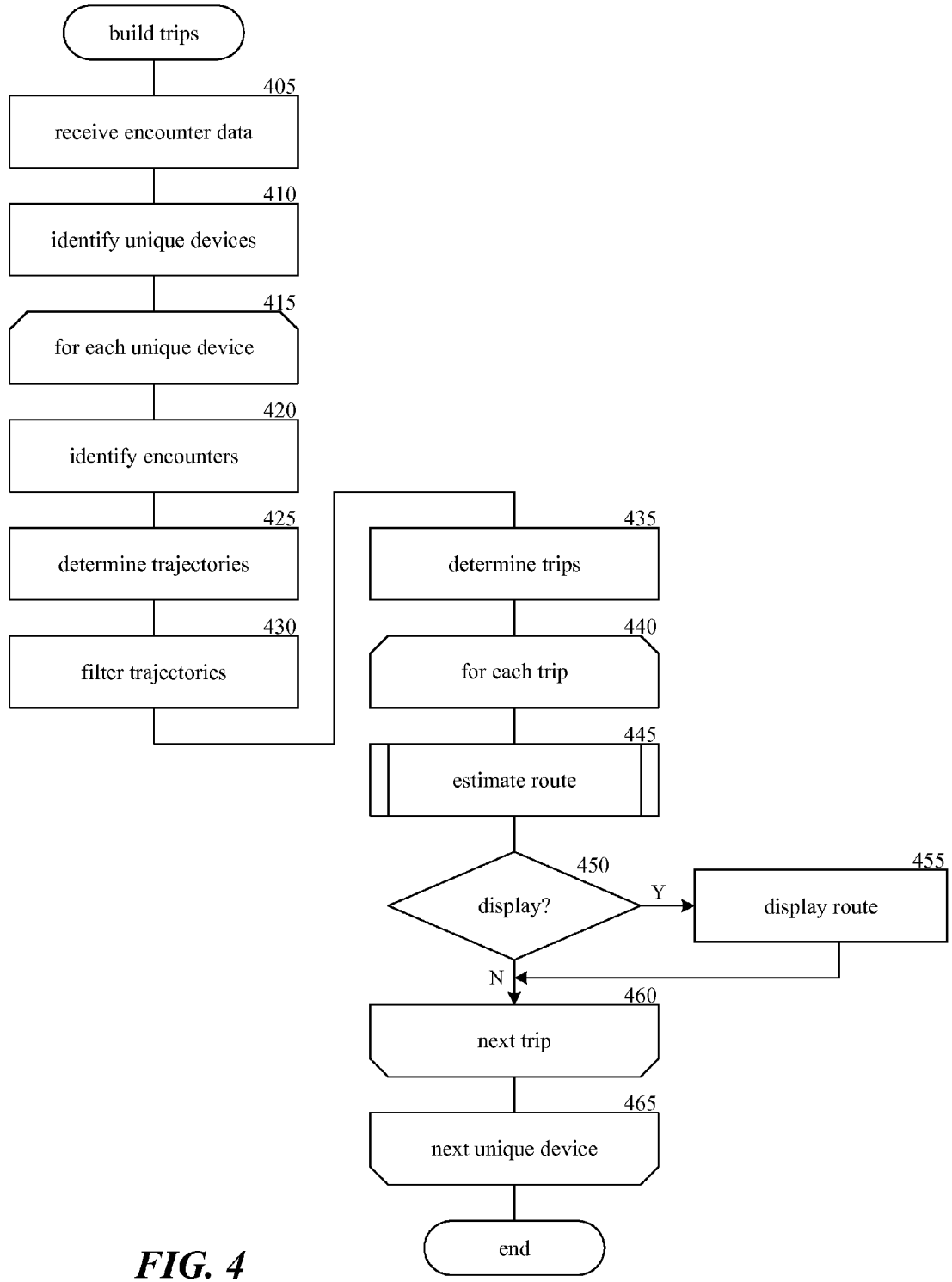
FIG. 4 is a flow diagram illustrating the processing of a build trips component in accordance with one embodiment of the disclosed technology.

FIG. 4 is a flow diagram illustrating the processing of a build trips component in accordance with one embodiment of the disclosed technology. The facility invokes the build trips component to construct, for each detected device identified in the encounter data, one or more trips (or set of trajectories) associated with the device and an estimate of the route taken for that trip. In block 405, the component receives encounter data from mobile sensor devices. The component may periodically query mobile sensor devices for encounter data and/or the mobile sensor devices may periodically push encounter data to the component. In block 410, the component identifies unique device identifiers from among the received encounter data. In some embodiments, the component may discard encounter data if there is insufficient information for a particular device (e.g., if the encounter data includes fewer than a predetermined number of encounters for the device, such as 1, 5, 10, and so on). In blocks 415-465, the component loops through each of the identified unique devices to identify trips and estimate routes for each trip. In block 420, the component identifies encounters for the currently-selected device from the received encounter data and orders the encounters chronologically. In block 425, the component identifies trajectories for the currently-selected device, each trajectory corresponding to a directed line segment beginning at one encounter and ending at a subsequent encounter. In block 430, the component filters or clusters the trajectories based at least in part on, for example, time, speed (distance divided by time), location, etc. In some embodiments, users may register multiple devices with the facility and the facility may identify trajectories for a user across each of the registered devices. In block 435, the component determines one or more trips for the currently-selected device (or user). In blocks 440-460, the component loops through each of the trips to estimate a route for the trip. In block 440, for each determined trip, the component invokes an estimate route component to estimate a route for the trip. In decision block 450, if the estimated route is to be displayed, the component continues at block 455, else the component continues at block 460. In block 455, the component displays an indication of the estimated route by, for example, drawing the route as part of a map overlay. In some embodiments, the route may be colored, shaded, or blended based at least in part on the confidence of the estimation. For example, routes with a high confidence may be darker than routes with a low confidence. In block 460, the component selects the next trip, if any, and then loops back to block 440. In block 465, the component selects the next unique device, if any, and then loops back to block 415.

Figure 5:
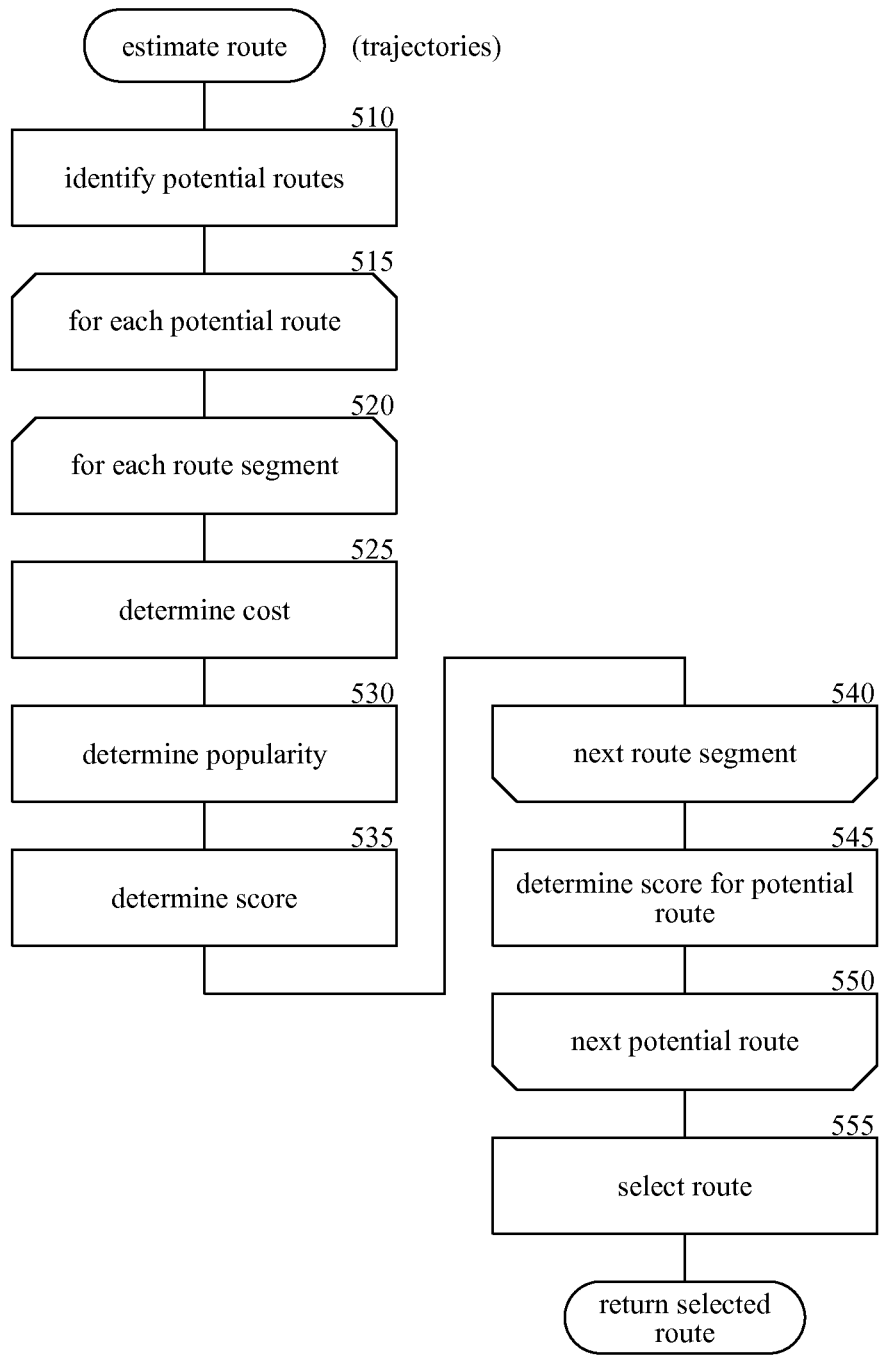
FIG. 5 is a block diagram illustrating the processing of an estimate route component in accordance with an embodiment of the disclosed technology.

FIG. 5 is a block diagram illustrating the processing of an estimate route component in accordance with an embodiment of the disclosed technology. The facility invokes the estimate route component to translate a trip (a set of trajectories) into an estimated route based at least in part on the trajectories and encounters associated with the trip (e.g., points where associated encounters occurred). For example, the component may use GIS data provided by a government or commercial entity that identifies known routes and route segments between points and associated costs, distances, travel times, etc. In block 510, the component identifies potential routes for the trip based at least in part on the associated trajectories and, for example, publicly available geographical information system (GIS) data, known route information, or other suitable information. Because there may be any number of potential routes between two points, the component may limit the number of identified routes to a predetermined number of routes based at least in part on distance (e.g., the 5, 10, or 50 shortest routes), time (e.g., the 10, 30, or 100 quickest routes), or popularity (e.g., the 3, 12, or 20 most popular routes). In some cases, the component may identify routes based at least in part on common or average travel times for those routes and the travel time associated with the trip or set of trajectories. For example, if a first route has an average travel time of 15 minutes, a second route has an average travel time of 2 minutes, and the first encounter for the trip occurred 3 minutes prior to the last encounter, then the component may identify the second route as a potential route but not the first route. Alternatively, if the first encounter for the trip occurred 17 minutes prior to the last encounter, then the component may identify the first route as a potential route but not the second route. In blocks 515-550, the component loops through each of the identified potential routes to determine a score for the route. In blocks 520-540, the component loops through each route segment associated with the potential route to determine a score for each route segment. In block 525, the component determines a cost for the route segment. The cost for each route segment is a relative indication of the amount of time that it would take to travel along the route segment at a specified time and may be computed using any combination of publicly available data, such as GIS data, traffic data (e.g., current congestion information, current travel or transit times, average congestion information based at least in part on the current time of day, average travel or transit times based at least in part on the current time of day, and/or other suitable data). In block 530, the component determines a popularity rating for the route segment based at least in part on, for example, how often users choose a particular route. In some embodiments, routes may have multiple popularity ratings based at least in part on time of day, time of year, weather conditions, and so on. For example, a route through a forested area may be less popular at night than during the day while a route that includes a covered walkway may be more popular when it is raining. In block 535, the component determines a score for the route segment based at least on the determined cost and popularity. For example, the score may be calculated according to the following formula:

$$score_{segment} = W_2 \cdot cost - W_1 \cdot f(popularity)$$

or $$score_{segment} = \frac{W_1 \cdot f(popularity)}{W_2 \cdot cost},$$

or if $\left(\alpha * g(p) f(popularity) + \sum_{i=1}^{n} \beta_i h(\ldots) < 0\right)$ then $wscore_{segment} =$ $$dcost + \max\left(\alpha * g(p) f(popularity) + \sum_{i=1}^{n} \beta_i h(\ldots) \mid -\gamma dcost\right)$$

else $score_{segment} w =$ $$dcost + \min\left(\alpha * g(p) f(popularity) + \sum_{i=1}^{n} \beta_i h(\ldots) \mid \gamma dcost\right)$$

where $score_{segment}$ represents the score determined for the route segment, $W_1$ represents a pre-defined constant corresponding to a popularity weighting factor, f(popularity) represents a determined popularity function for the segment, popularity represents the volume of individuals encountered along the segment (e.g., the number of individuals encountered during a predetermined period, such as the last hour, day, week, month or the average number of individuals encountered during a previous set of time periods, such as 7 am to 9 am for the past 6 months, 10 am to noon for the previous year, 5 pm to 7 pm during last March or last spring, noon to 1:30 pm Monday through Friday, and so on), $W_2$ represents a pre-defined constant corresponding to weighting factor for cost, cost represents the determined cost for the segment (e.g., "length" in terms of distance or duration), h( . . . ) is a function that incorporates other potential factors (e.g., privacy, link centrality, attractions, etc.), α represents a route popularity weight, $\beta_i$ represents a weight of a particular parameter included in h( . . . ) and γ is the maximum allowable proportion of the cost that can be affected by all factors, which ensures that the maximum allowable decrease in link cost is not more than γ*cost. In some embodiments, f(popularity) is a simple quadratic function, first starting at zero, growing positive, then reducing and becoming negative in order to represent an individual's desire to walk on populated paths, but not ones that are too crowded. For example, f(popularity) may be calculated according to the following formula:

$$f(\text{popularity}) = \frac{\gamma * \text{cost} * \text{popularity}^2}{(LOS_E/2)^2} - \frac{\gamma * \text{cost} * \text{popularity}}{LOS_E/4}$$

where $$LOS_E = 15 * \text{cost} * t * BT$$

and BT is the percentage of individuals with Bluetooth-visible devices, t is the evaluation time interval length in minutes, and the constant 15 is derived from the Level of Service E defined as 15 ppl/ft/min in the Highway Capacity Manual Level of Service. Level of Service E is considered to be the turning point where pedestrian density becomes a detractor. One skilled in the art will recognize that the constant may be derived from other sources and that other values may be used for the constant and/or other percentages of individuals may be used in place of BT (e.g., percentage of individuals with mobile devices, percentage of users with GPS devices).

In block 540, the component selects the next route segment for the potential route, if any, and then loops back to block 520. In block 545, the component determines a score for the currently-selected potential route based at least in part on, for example, a summation or other aggregation of the scores determined for each associated route segment. In block 550, the component selects the next potential route, if any, and then loops back to block 515. In block 555, the component selects a route from among the potential routes based at least in part on the scores determined for each potential route and then returns the selected route. For example, the component may select the route with the highest score.

From the foregoing, it will be appreciated that specific embodiments of the technology have been described herein for purposes of illustration, but that various modifications may be made without deviating from the disclosure. The facility can include additional components or features, and/or different combinations of the components or features described herein. For example, in various embodiments, the facility may employ Dijkstra's algorithm when computing a path or route between any two points or encounters and/or other algorithms, such as the Bellman-Ford algorithm, breadth-first search, depth-first search, Euclidean shortest path algorithm, Floyd-Warshall algorithm, and so on. Additionally, while advantages associated with certain embodiments of the new technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method, performed by a computing system having a processor, for estimating the travel path of a plurality of unique devices, the method comprising:
   receiving, from each of a plurality of mobile sensor devices, encounter data comprising a plurality of encounters, each encounter specifying an indication of a unique device detected by the mobile sensor device, a location, and a time,
   wherein encounter data received from a first mobile sensor device and encounter data received from a second mobile sensor device include at least one encounter specifying an indication of a first unique device;
   based at least in part on the received encounter data, identifying a plurality of unique devices detected by the mobile sensor devices; and
   for each of the identified detected unique devices,
      identifying encounters of the identified detected device from the received encounter data;
      chronologically ordering the identified encounters for the identified detected device from the received encounter data;
      determining at least one directed line segment for the identified detected device based at least in part on the received encounter data, each directed line segment beginning at a first encounter of the identified detected device and ending at the next chronological encounter of the identified detected device, and
      based at least in part on the at least one directed line segment determined for the identified detected device, estimating a route for at least one trip for the identified detected device, wherein each directed line segment comprises exactly two encounters.

2. The method of claim 1 wherein each of the mobile sensor devices comprises a mobile telephone.

3. The method of claim 1 wherein at least one of the mobile sensor devices is configured to detect a first unique device based at least in part on information broadcast by the first unique device, wherein the information broadcast by the first unique device comprises an address associated with the first unique device.

4. The method of claim 1 wherein the location specified by at least one encounter comprises GPS coordinates.

5. A computer-readable hardware device storing instructions that, if executed by a computing system having a processor, cause the computing system to perform operations comprising:
   identifying a plurality of unique devices detected by at least one of a plurality of mobile sensor devices; and
   for each of the identified unique detected devices,
      identifying encounters of the identified unique detected device based at least in part on received encounter data,
      chronologically ordering the identified encounters of the identified unique detected device,
      determining at least one directed line segment for the identified detected device based at least in part on the received encounter data, each directed line segment comprising exactly two encounters beginning at a first encounter of the identified unique detected device and ending at the next chronological encounter of the identified unique detected device,
      wherein at least one directed line segment for the identified detected device comprises a first encounter received from a first mobile sensor device and a last encounter received from a second mobile sensor device, and
      based at least in part on the at least one directed line segment determined for the identified detected device, estimating a route for at least one trip for the identified detected device.

6. The computer-readable hardware device of claim 5, the operations further comprising:
   receiving, from a first mobile sensor device, first encounter data comprising a plurality of encounters, each encounter specifying an indication of a detected device, coordinates, and a timestamp;
   receiving, from the second mobile sensor device, second encounter data comprising a plurality of encounters, each encounter specifying an indication of a detected device, coordinates, and a timestamp.

7. The computer-readable hardware device of claim 6, wherein the first encounter data comprises at least one encounter specifying a first detected device and wherein the second encounter data comprises at least one encounter specifying the first detected device, and wherein the operations further comprise generating a directed line segment comprising:
   an encounter of the first encounter data specifying the first detected device, and
   an encounter of the second encounter data specifying the first detected device.

8. The computer-readable hardware device of claim 5, wherein estimating a route for the at least one trip further comprises:
   identifying a plurality of potential routes for the at least one trip, each route having a plurality of associated route segments;
   for each of the identified plurality of potential routes,
      for each of the route segments associated with the potential route,
         determining a cost for the route segment,
         determining a popularity for the route segment, and
         determining a score for the route segment based at least in part on the determined cost and the determined popularity,
      determining a route score for the potential route based at least in part on the scores determined for the route segments associated with the potential route; and
   selecting a route from among the potential routes based at least in part on the determined route scores.

9. A computing system comprising:
   a memory; and
   one or more processors configured to:
      receive encounter data from each of a plurality of mobile sensor devices, the encounter data comprising:
         a plurality of encounters, each encounter specifying an indication of a device detected by the mobile sensor device,
         a location, and
         a time,
      identify unique devices from among the encounter data, and
      for each identified unique device,
         identify encounters for the identified unique device,
         determine trajectories for the identified unique device, each trajectory comprising exactly two encounters beginning at a first encounter of the identified unique device and ending at the next chronological encounter of the identified unique device,
         filter the determined trajectories,
         determine trips for the identified unique device, and
         for each determined trip,
            estimate a route for the trip, and
            in response to determining that the estimated route is to be displayed, cause the estimated route to be displayed.

10. The computing system of claim 9, wherein at least one of the trajectories comprises a first encounter detected by a first mobile sensor device and a second encounter detected by a second mobile sensor device, wherein the first mobile sensor device is different from the second mobile sensor device.

11. The computing system of claim 9, wherein at least one of the devices detected by a first mobile sensor device comprises at least one of a valve cap or a thermometer.

12. The computing system of claim 9, wherein at least one of the devices detected by a first mobile sensor device is a mobile sensor device.

13. The method of claim 1, further comprising:
   clustering directed line segments for at least one mobile sensor device based at least in part on a speed associated with each directed line segment.

14. The method of claim 1, further comprising:
   clustering directed line segments for at least one mobile sensor device based at least in part on a location associated with each directed line segment.

15. The method of claim 1, wherein estimating the route for at least one trip for the identified detected device comprises identifying potential routes between the first encounter of the at least one directed line segment and the last encounter of the at least one directed line segment based at least in part on geographical information system (GIS) data and known route information.

16. The method of claim 1, wherein the estimated travel path is the likely path taken by the identified detected device between the location of the first encounter and the location of the last encounter for the identified device.

17. The method of claim 1, wherein an increased number of encounters in the encounter data for the identified detected device for the at least one trip increases a likelihood that the estimated route corresponds to a route actually taken by the identified detected device between the location of the first encounter and the location of the last encounter for the identified detected device.

18. The method of claim 1, wherein the encounter data includes encounters received from the first mobile sensor device specifying a number of encounters for both the first unique device and a second unique device, and wherein the number of encounters for the first unique device is greater than the number of encounters for the second unique device when the first mobile sensor device is traveling in a same direction as the first unique device and the first mobile sensor device is traveling in an opposite direction from the second unique device.

19. The method of claim 1, wherein each location is a physical location of the mobile sensor device from which the encounter is received, and wherein each physical location is recorded by the mobile sensor device after the indicated device is detected by the mobile sensor device.

20. The method of claim 1, wherein each location is a physical location of the mobile sensor device from which the encounter is received, and wherein each physical location data is recorded by the mobile sensor device based on a detection of the device indicated by the indication at the mobile sensor device.

21. The computing system of claim 9, wherein the one or more processors are configured to estimate a route for each trip at least in part by:
   identifying potential routes for the trip;
   for each identified potential route,
      for each route segment of the identified potential route,
         determining a cost for the route segment,
         determining a popularity for the route segment, and
         determining a score for the route segment,
      determining a score for the identified potential route; and
   selecting a route from among the identified potential routes.

* * * * *